Jan. 17, 1939.  L. G. SIMJIAN  2,143,926
POSE-REFLECTING APPARATUS
Filed Aug. 22, 1935   6 Sheets-Sheet 1
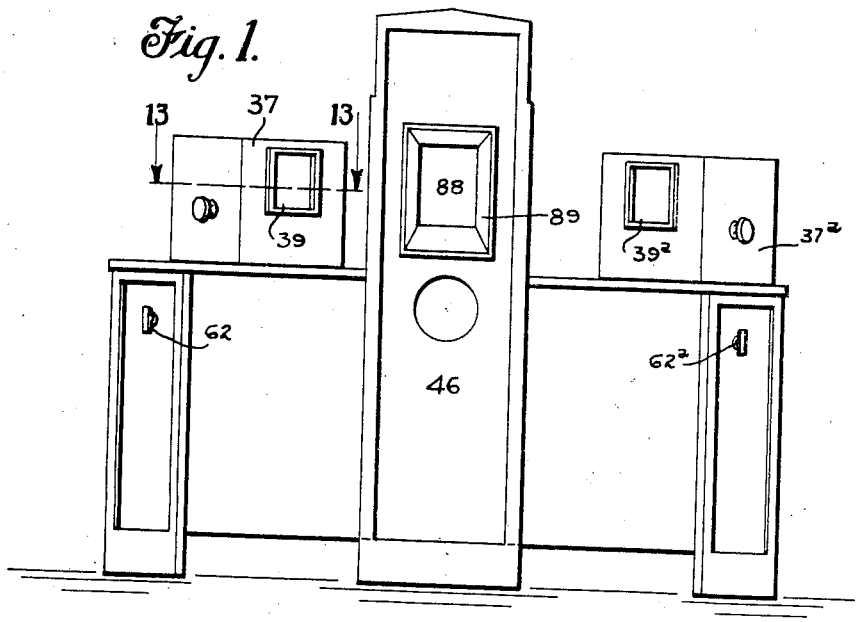
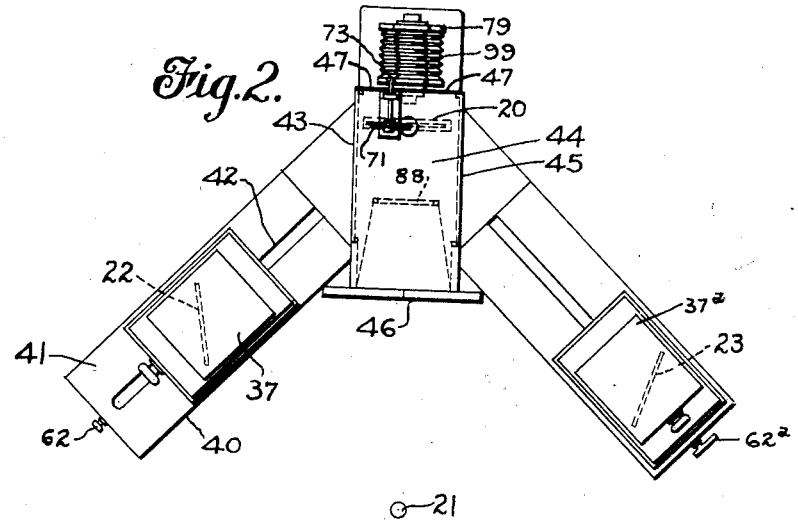
Inventor:
Luther G. Simjian
Seymour Earle & Nichols
Attorneys.

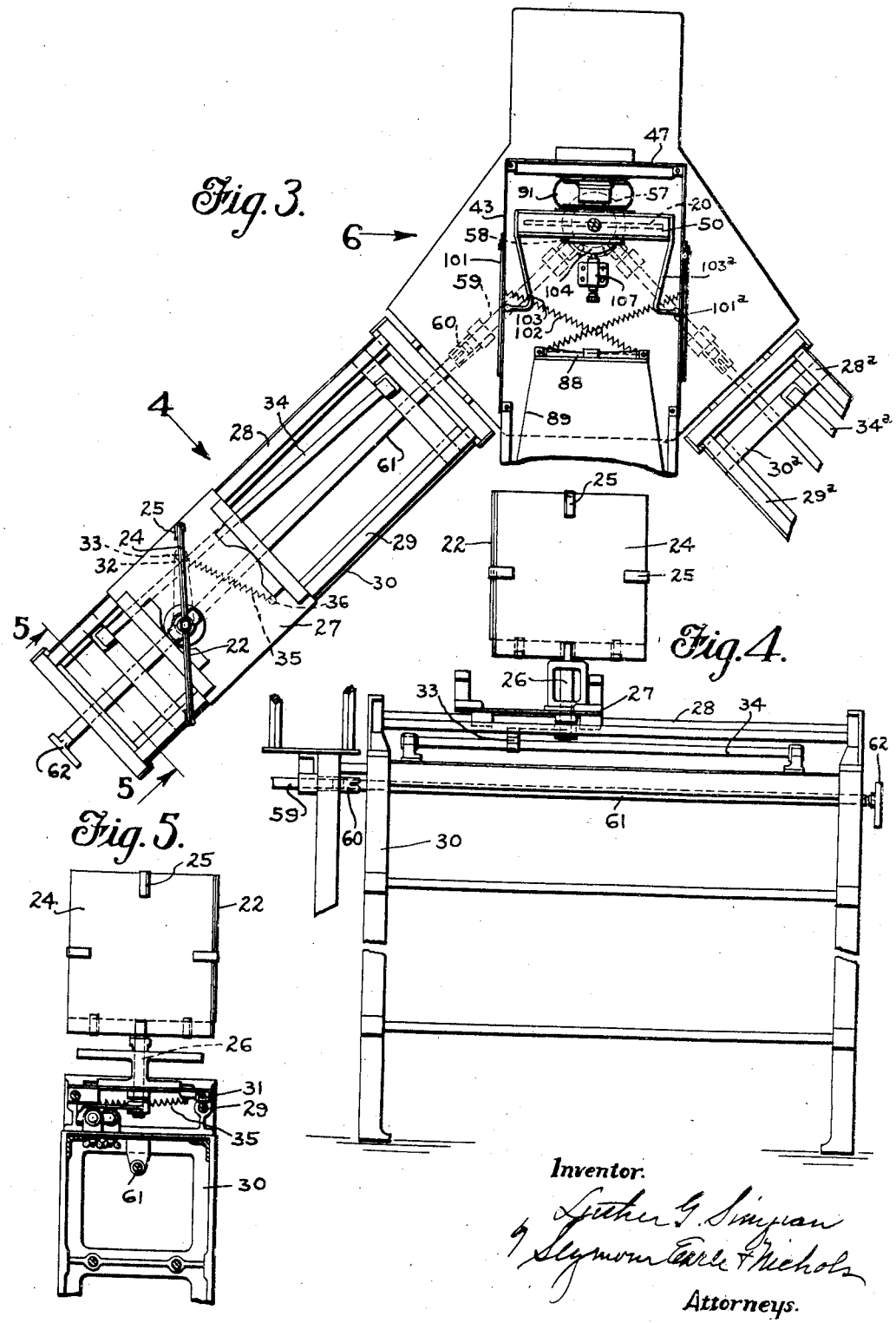

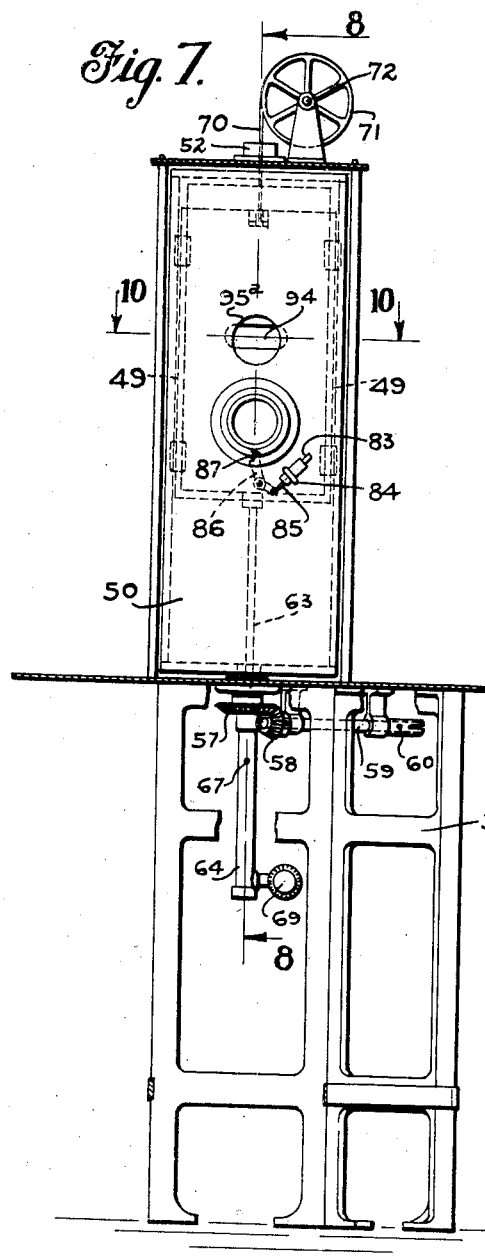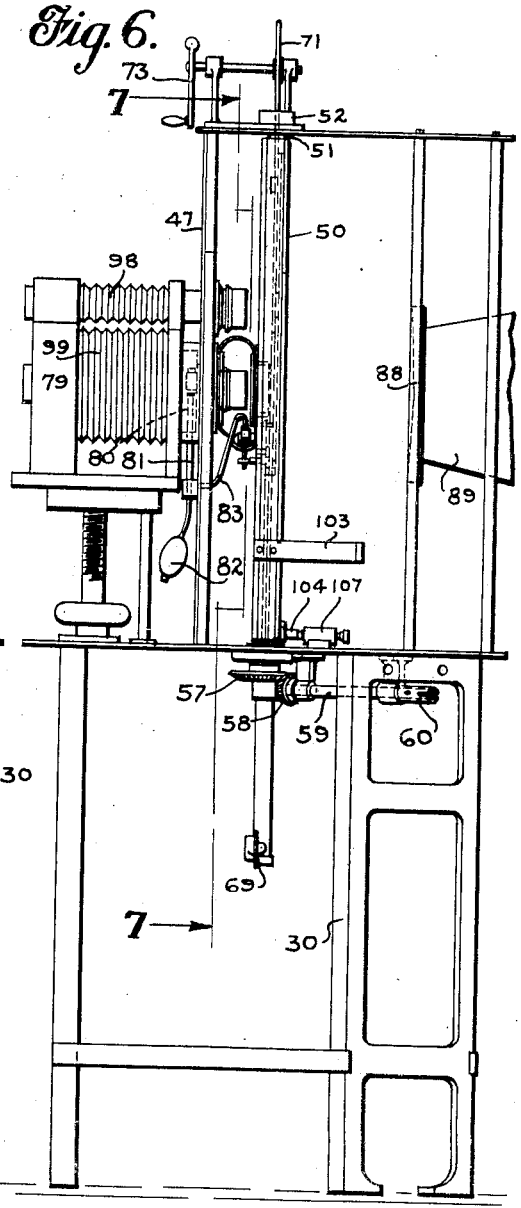

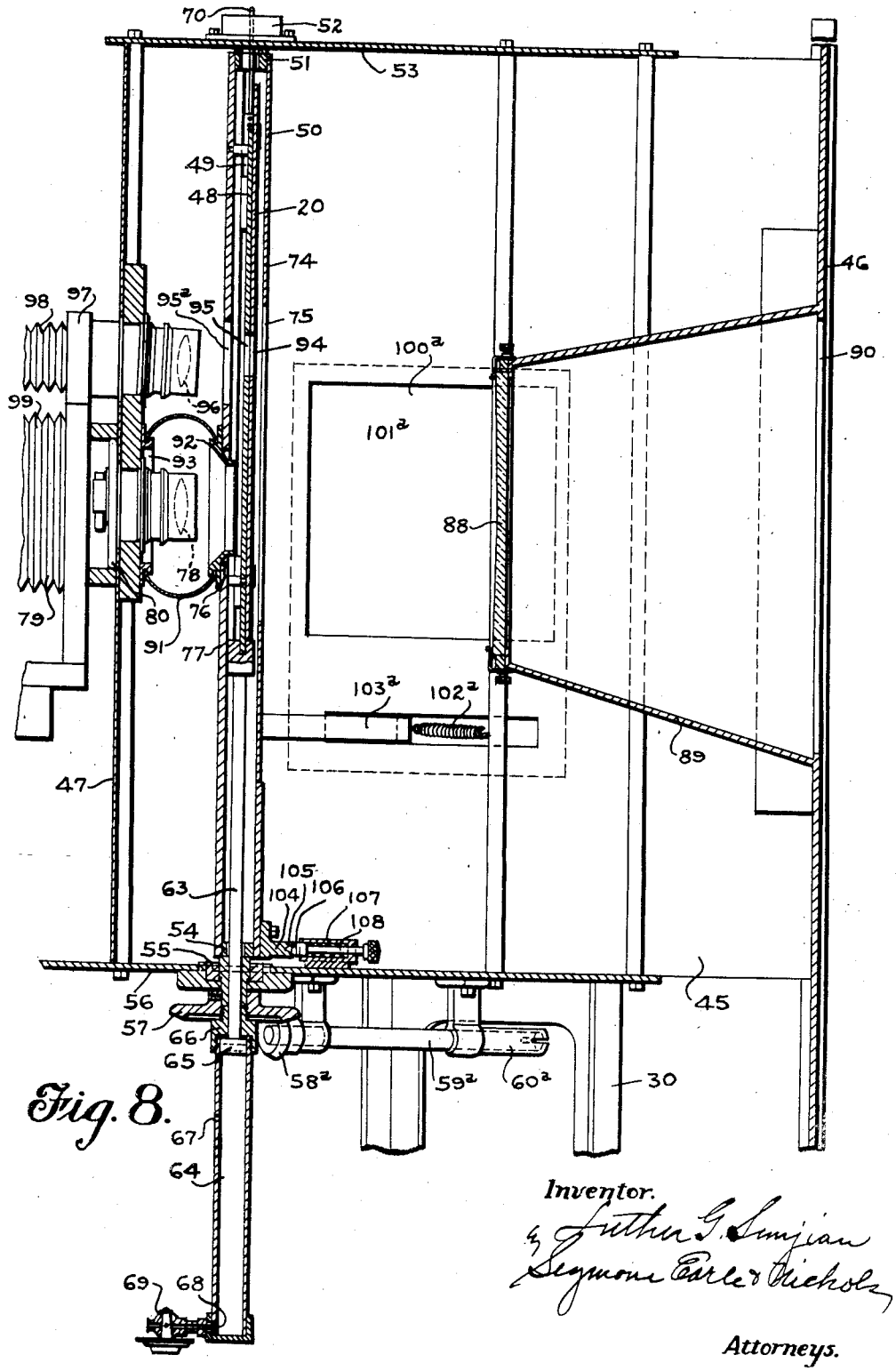

Jan. 17, 1939.　　　　　L. G. SIMJIAN　　　　　2,143,926
POSE-REFLECTING APPARATUS
Filed Aug. 22, 1935　　　　　6 Sheets-Sheet 5

Inventor.
Luther G. Simjian
Seymour Earle Nichols
Attorneys.

Jan. 17, 1939.  L. G. SIMJIAN  2,143,926
POSE-REFLECTING APPARATUS
Filed Aug. 22, 1935   6 Sheets—Sheet 6
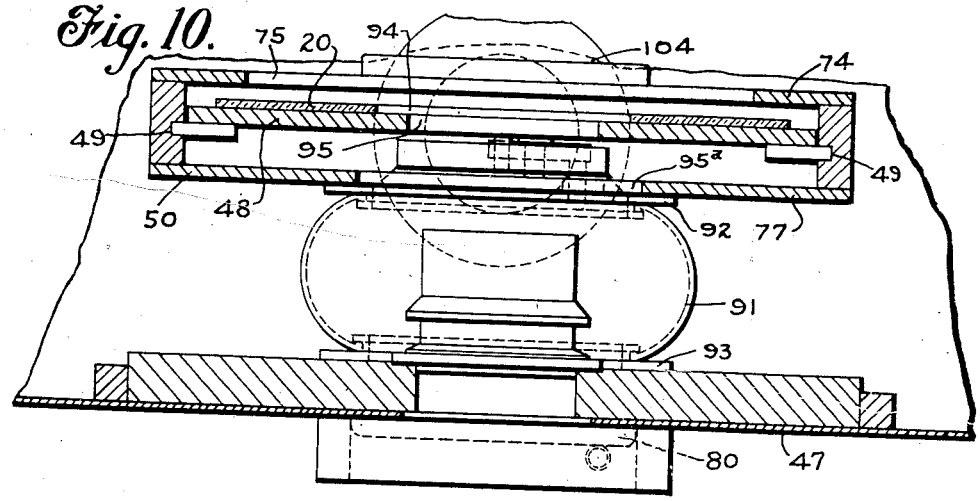
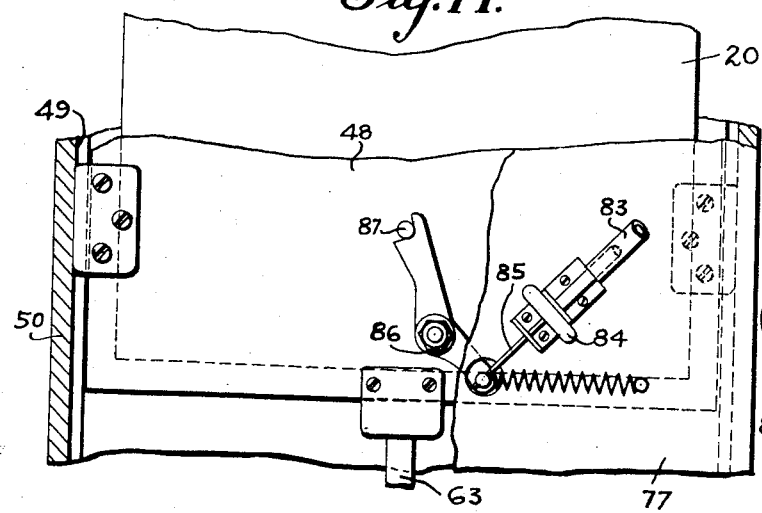
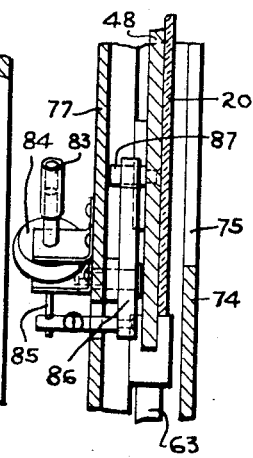
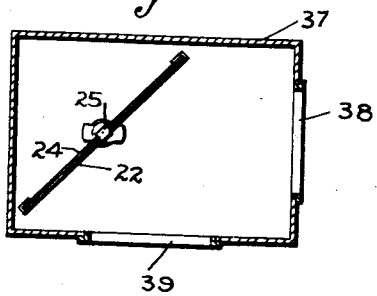
Inventor.
Luther G. Simjian
by Seymour Earle & Nichols
Attorneys.

Patented Jan. 17, 1939

2,143,926

UNITED STATES PATENT OFFICE 2,143,926

POSE-REFLECTING APPARATUS

Luther G. Simjian, New Haven, Conn., assignor to Noel Associates, Inc., New York, N. Y., a corporation of New York Application August 22, 1935, Serial No. 37,334
In Great Britain October 2, 1934

11 Claims. (Cl. 88—74)

This invention relates to pose-reflecting systems or apparatus and is particularly adapted for use in conjunction with photographic apparatus, though not so limited.

Pose-reflecting apparatus have heretofore been devised in which a poser is enabled to observe a full-face view and various degrees of profiles, to which class of apparatus the present invention relates and over which it embodies marked improvements.

One of the objects of the present invention is to provide an attractive pose-reflecting apparatus of simple, reliable and effective construction.

Another object of the present invention is to provide a superior pose-reflecting apparatus including one or more adjustable profile mirrors which are conveniently and attractively mounted.

A further object is to provide a superior pose-reflecting apparatus capable of distinctly reflecting a plurality of distinct images to the poser without confusing reflections.

Another object is to provide a combined pose-reflecting and photographic apparatus in which is employed a movable pose-reflecting mirror, the movement of which is synchronized with the operation of shutter of the camera.

With the above and other objects in view, as will appear to those skilled in the art from the following, considered in conjunction with the accompanying drawings and appended claims, the present invention includes all features disclosed therein which are novel over the prior art.

In the accompanying drawings:

Fig. 1 is a view in front elevation of a combined pose-reflecting and photographic apparatus embodying the present invention;

Fig. 2 is a top or plan view thereof;

Fig. 3 is a broken top or plan view with the camera and portions of the casing omitted;

Fig. 4 is a broken face view of the left wing of the apparatus viewed in the direction of the arrow 4 of Fig. 3;

Fig. 5 is a transverse sectional view taken on the line 5—5 of Fig. 3;

Fig. 6 is a broken elevational view looking in the direction of the arrow 6 in Fig. 3;

Fig. 7 is a sectional view taken on the line 7—7 of Fig. 6;

Fig. 8 is a vertical sectional view on an enlarged scale taken on the line 8—8 of Fig. 7;

Fig. 10 is a broken horizontal sectional view taken on the line 10—10 of Fig. 7;

Fig. 11 is a broken detail view illustrating the mirror-latch and associated parts;

Fig. 12 is an edge view of the parts shown in Fig. 11; and

Fig. 13 is a horizontal sectional view taken on the line 13—13 of Fig. 1.

Figure 9:
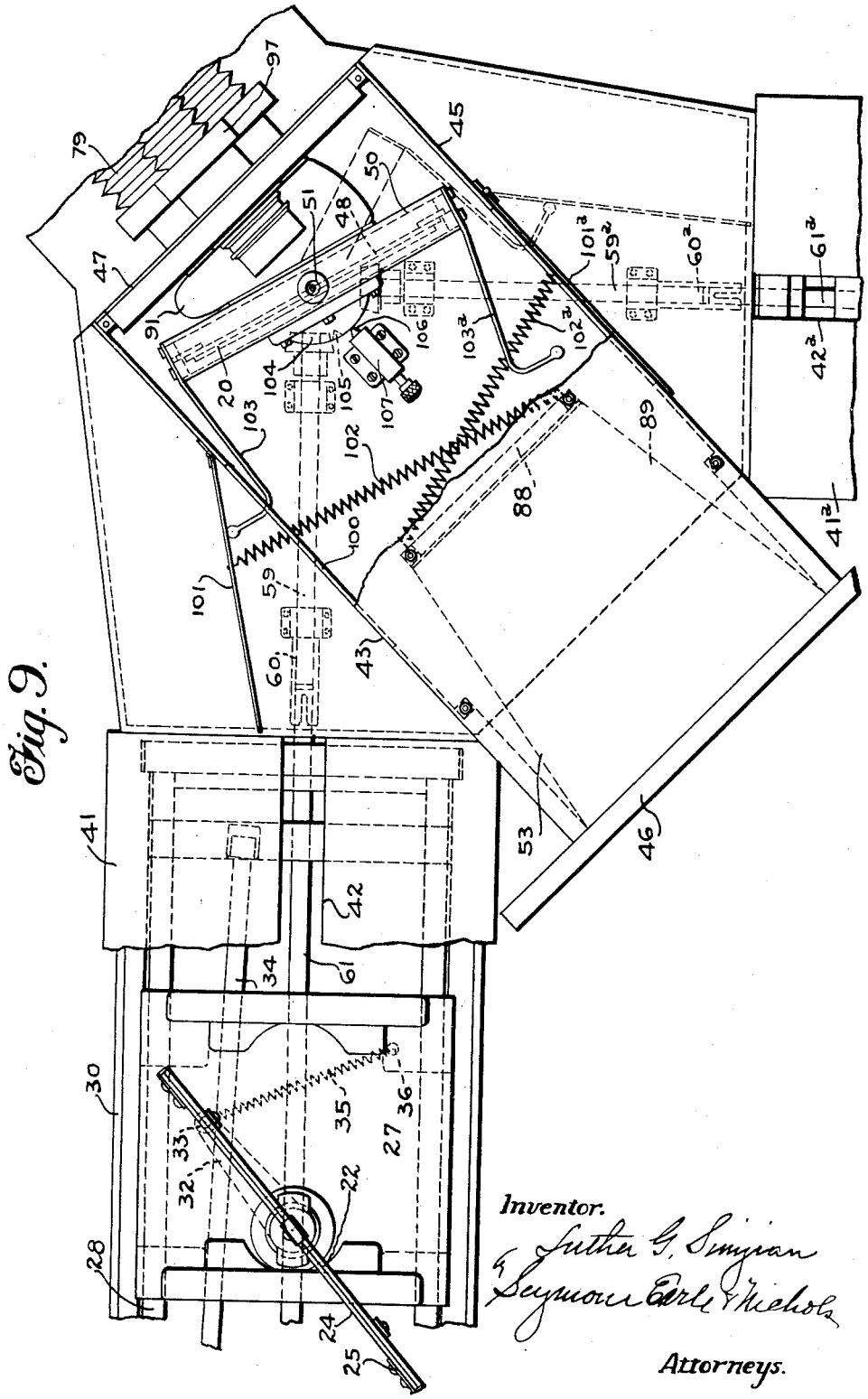
Fig. 9 is a broken top or plan view similar to Fig. 3 and indicating the central mirror and associated parts as set for reflecting the poser's image to the left profile mirror.

The pose-reflecting apparatus herein chosen for the illustration of the present invention includes a central mirror 20 which, for purpose of convenience of description, will be referred to as the "primary" mirror. The said primary mirror 20 is mounted for lateral swinging movement, as will more fully hereinafter appear, and when in the position in which it is indicated in Figs. 2 and 3, is adapted to reflect an image of a poser, represented at 21, directly back to such poser.

Located forwardly and laterally to the left of the primary mirror 20 is a mirror 22 which, for convenience of description, will be designated as a "secondary" mirror, and which on occasion is adapted to receive from the primary mirror 20 various profile images of a poser and to reflect the same diagonally to said poser. Forwardly and laterally to the right of the primary mirror 20 is another mirror 23, similar to the mirror 22 before described and like the same designated as a "secondary" mirror, inasmuch as it is adapted to perform a similar function thereto.

Inasmuch as the two secondary mirrors 22 and 23 correspond in all essential respects, it will be sufficient for the present purpose to describe in detail the parts associated with the left wing of the apparatus and hence with the mirror 22, which parts are duplicated in connection with the mirror 23 and where visible will bear reference characters corresponding to the reference characters used in connection with the parts associated with the mirror 22 save that the character "a" will be added.

The secondary mirror 22 is secured to a backing-plate 24 in any suitable manner such, for instance, as by clips 25 (Figs. 4 and 5). The backing-plate 24, just referred to, is rigidly mounted upon the upper end of a vertical shaft 26 suitably journaled in a carriage 27, which latter is adapted to slide bodily toward and away from the primary mirror 20 and carry with it the said secondary mirror 22. For the purpose of guiding the said carriage 27, two laterally-spaced-apart guide-rods 28 and 29 are employed, which guide-rods are suitably supported at their respective opposite ends in suitable framework generally designated by the numeral 30. The guide-rod 28 passes through the carriage 27 adjacent the outer edge thereof, while the guide-rod 29 has engaged with its upper surface one or more rollers 31 carried by the said carriage 27 adjacent its inner edge, as illustrated in Fig. 5.

As before noted, the shaft 26, carrying the secondary mirror 22 and its associated parts, is journaled in the carriage 27 and is further provided at its lower end with an adjusting-arm 32. The outer end of the said adjusting-arm is provided with a roller 33 (Figs. 3 and 4) bearing against the outer surface of an adjusting-rod 34 which is disposed at a slight angle with respect to the guide-rods 28 and 29 and serves, as the carriage 27 is moved away from the primary mirror 20, to swing the secondary mirror 22 in a counterclockwise direction as the parts are viewed in Fig. 3. The counterclockwise movement of the said mirror is effected against the tension of a helical spring 35 which is attached at one end to the adjusting-arm 32 and at its opposite end to a stud 36 depending from the under-side of the carriage 27. The said spring 35 exerts a constant effort to swing the secondary mirror 22 in a clockwise direction and hence serves to maintain the roller 33 on the adjusting-arm 32 in engagement with the outer surface of the obliquely-disposed adjusting-rod 34.

Located over the secondary mirror 22 and suitably secured to the carriage 27 for concurrent movement therewith is a box-like casing generally designated by the numeral 37 and having in its wall facing toward the primary mirror 20 a light-aperture 38 and having in its front wall facing toward the poser 21 a light-aperture 39, as shown particularly well in Fig. 13.

As illustrated in Figs. 1 and 2, the framework 30, together with the guide-rods 28, 29 and the adjusting-rod 34 and other associated parts, has superimposed over it a cabinet-wing generally designated by the numeral 40 and having in its top-wall 41 an unobstrusive longitudinal slot 42, through which the constricted portion of the carriage surrounding the shaft 26 is adapted to extend.

The cabinet-wing 40 angularly merges into the adjacent side-wall 43 of a relatively-tall central cabinet generally designated by the numeral 44 and including a complementary side-wall 45, a front-wall 46 and a rear-wall 47.

The central or primary mirror 20, before referred to, is housed within the central cabinet 44 and is suitably secured to a backing-plate 48 which is guided for vertical movement at its respective opposite side-edges in spaced-apart guide-ways 49—49 constituting the side-bars of a pivotal rectangular mirror-carrier 50 having an upstanding hollow stud 51 at its upper end rotating in a suitable bearing 52 secured to the top-wall 53 of the central-cabinet 44. Extending downwardly from the mirror-carrier 50 axially in line with the hollow stud 51 is a complementary hollow stud 54 mounted for turning movement in a suitable bearing 55 secured to a shelf-like partition 56 extending rearwardly from the front-wall 46 of the central cabinet 44 and outwardly beyond the rear wall 47 thereof to mount a camera, as will more fully hereinafter appear.

As thus mounted, the rectangular mirror-carrier 50 is adapted to be oscillated in a horizontal plane in any suitable manner such, for instance, as by providing the hollow stud 54 with a bevel-gear 57 which meshes into a bevel-pinion 58 secured to the rear end of a shaft 59, which in turn is connected by means of a coupling 60 to a control-shaft 61 extending longitudinally through the framework 30 of the left wing of the apparatus and provided at its extreme outer end with a suitable handle 62.

Secured to the lower edge of the backing-plate 48 of the mirror 20 is a piston-rod 63 extending downwardly through the hollow stud 54 and into an air-cylinder 64 where it is provided with a piston-head 65. The said piston-rod 63 also extends through a cylinder cap-member 66 which is securely threaded into the bevel-gear 57 and hence serves to rigidly attach the cylinder 64 and associated parts to the hollow stud 54 for turning movement with the mirror 20 and associated parts. Part way down its length, the cylinder 64 is provided with a vent-port 67 through which air may escape and at its lower end is provided with a vent-port 68 through which air is also adapted to escape under the adjustable control of an air-valve 69.

The backing-plate 48, the mirror 20, and the parts connected therewith, are adapted to vertically reciprocate in the mirror-carrier 50, and for the purpose of lifting the said mirror 20, etc., into its uppermost position, in which position it is indicated particularly well in Figs. 6 and 8, a chain 70 is attached to the upper portion of the said backing-plate 48 and passes upwardly through the hollow stud 51, thence over a sprocket-wheel 71 to which it is suitably attached. The said sprocket-wheel is rigidly secured to a shaft 72 having also rigidly secured to it an operating-handle 73.

The laterally-swinging mirror-carrier 50 is provided with a front-wall 74, having a relatively large aperture 75 therein registering with a smaller aperture 76 in the rear-wall 77 of the said mirror-carrier. The last-mentioned aperture 76 is in registration with the lens 78 of a camera 79 having a shutter-mechanism of standard form and generally indicated by the numeral 80. The shutter-mechanism, just referred to, is operated by air-pressure supplied through a flexible tube 81 through which air is pumped by means of a hand-compressible bulb 82 (Fig. 6).

Also connected into the tube 81, just above referred to, is a second tube 83 leading to an extensible bellows 84 secured to the rear-wall 77 of the mirror-carrier 50 and having an operating-plunger 85 responding to an injection of compressed air into the bellows 84 and connected to the lower arm of a latch 86 pivoted intermediate its respective opposite ends to the front face of the rear-wall 77, just referred to. The upper end of the latch 86 is suitably notched and engages with a latch-pin 87 rigidly secured to and rearwardly extending from the backing-plate 48 of the mirror 20.

Arranged in front of the mirror 20 in line with the lens 78 of the camera 79 is a rectangular reducing-lens 88 mounted in the rear end of a forwardly-and-outwardly-tapering hood 89 projecting rearwardly from the rear face of the front-wall 46 of the central cabinet 44, as particularly well shown in Fig. 8. The said front-wall 46 in line with the reducing-lens 88, just referred to, is provided with an aperture 90 through which a poser may observe his reflection in the mirror 20 as modified in size by the intervention of the reducing-lens 88.

As before pointed out, the mirror-carrier 50 may be swung laterally and in order to prevent stray light from impinging upon the lens 78 of the camera 79, a flexible tubular light-shield 91 is attached to the rear wall of the said carrier 50 by means of a fixture 92 and is attached to the front of the camera 79 by means of a fixture 93.

The central or primary mirror 20, as before pointed out, is adapted to be moved vertically and may descend from the position in which it is indicated in Figs. 7 and 8, for instance, to temporarily register an aperture 94 formed in the said mirror about midway of its length with the lens 78 of the camera 79 to photographically record the image of a poser. The aperture 94 in the mirror 20 is registered with a similar aperture 95 in the backing-plate 48, and when the latch 86 is in its latching position, these apertures 94 and 95 are in alignment with an aperture 95a in the rear-wall 77 of the carriage 50. Just back of the aperture 95a is the lens 96 of a focusing device, generally designated by the numeral 97. The said focusing device includes a flexible bellows 98 located above the flexible bellows 99 of the camera 79 and concurrently movable therewith. The photographer may, by adjusting the focusing device 97, simultaneously focus the camera 79. By gazing into the rear end of the focusing device, the photographer may observe an image of the poser through the lens 96 thereof as picked up from the reducing-lens 88.

When the central mirror 20 is in its intermediate position, as indicated particularly well in Figs. 2 and 3, the poser 21 may observe a direct reflection of his image from the said mirror. Should, however, the observer desire to observe his image in profile or partial profile, this opportunity may be afforded him by manipulating the handle 62 at the end of the left wing of the apparatus, and through the interconnecting parts effecting the turning of the central or primary mirror 20 into the position in which it is indicated in Fig. 9. When the central mirror 20 is moved as described by correspondingly turning the mirror-carrier 50, the image of the poser will be reflected from the said mirror 20 outwardly through the light-aperture 38 in the box-like casing 37 onto the secondary mirror 22, from which latter the image will be reflected outwardly through the aperture 39 to the poser.

The deflection of the image of the poser from the primary mirror 20 to the secondary mirror 22 is effected through a light-aperture 100 formed in the side-wall 43 of the central cabinet 44, which aperture is normally closed by a retirable light-shutter 101 hinged at its rear end to the said side-wall and normally drawn inwardly to close the said aperture 100 by means of a helical spring 102. As soon as the mirror-carrier 50, and the primary mirror 20 carried thereby, are swung to the left, as indicated in Fig. 9, the opening of the light-shutter 101 is automatically effected by means of an L-shaped actuating-arm 103 secured to the left side of the mirror-carrier 50.

When the mirror-carrier 50 and its mirror 20 are restored to the positions in which they are shown in Fig. 3 from the positions in which they are shown in Fig. 9, the actuating-arm 103 will retire and permit the spring 102 to assert itself and swing the light-shutter 101 over the aperture 100 and thus shut out the lateral access of light to the interior of the central cabinet 44.

By manually sliding the box-like casing 37 toward and away from the primary mirror 20, the poser may observe various degrees of profile in the secondary mirror 22 inasmuch as when the said casing is so shifted, the angularity of the said secondary mirror 22 will be automatically varied to properly reflect the image by the co-action of the roller 33 with the inclined adjusting-rod 34.

After a poser is satisfied with the image reflected to him by any one of the various mirrors of the apparatus, the bulb 82 may be squeezed to simultaneously open the shutter 80 of the camera 79 and to retire the latch 86, whereupon the central mirror 20, together with its backing-plate 48, will descend by gravity and cause the momentary registration of the apertures 94 and 95 in the said parts 20 and 48 with the lens 78 of the camera 79, to thus photographically record the image of the poser. The descent of the mirror 20 and associated parts will be relatively free until such time as the piston-head 65 passes the port 67 in the cylinder 64, after which air will be compressed in the lower portion of the said cylinder and cause the slowing up of the mirror to any desired speed governed by the adjustment of the valve in permitting the escape of air from the cylinder through the exhaust-port 68.

The central or primary pose-reflecting mirror 20 may, if desired, be swung to the right from the position in which it is indicated in Figs. 2 and 3 to the position in which it is indicated by broken lines in Fig. 9, to thereby reflect an infinite variety of profile images to the poser 21 from the secondary mirror 23.

For the purpose of releasably holding the mirror-carrier 50 in any one of its chosen positions of adjustment, the said carrier is provided with an arcuate extension 104 having three (more or less) forwardly-opening tapered pockets 105 therein, sequentially adapted to receive the tapered inner end of a retirable plunger 106 mounted in a body-member 107 and pressed rearwardly by a helical spring 108 mounted within the said body-member.

The invention may be carried out in other specific ways than those herein set forth without departing from the spirit and essential characteristics of the invention, and the present embodiments are therefore to be considered in all respects as illustrative and not restrictive, and all changes coming within the meaning and equivalency range of the appended claims are intended to be embraced therein.

I claim:

1. In a pose-reflecting apparatus, the combination of a primary mirror and a secondary mirror horizontally spaced from and angularly disposed with respect to each other and in which secondary mirror a poser may observe his image as reflected from the said primary mirror, the said secondary mirror being mounted in a casing substantially inclosing it; readily operable means for bodily adjusting at will said casing and secondary mirror toward and away from said primary mirror, including means for supporting said casing in adjusted position, said casing being provided with an aperture through which light travels from said primary mirror to said secondary mirror, and also having a second aperture through which the poser may observe his image in said secondary mirror as reflected from the said primary mirror; a shutter interposed in the light path between the said primary and secondary mirrors; and means for adjusting said shutter into or out of said light path as desired.

2. In a pose-reflecting apparatus, the combination of a swinging primary mirror and a secondary mirror spaced from and angularly disposed with respect to each other and in which secondary mirror a poser may observe his image as reflected from said swinging primary mirror, the said swinging primary mirror being mounted for swinging movement in a substantially-horizontal plane and the said secondary mirror being mounted in a casing substantially inclosing it; supporting means for said casing; and means for bodily adjusting said casing and said secondary mirror on said support toward and away from said primary mirror, said casing being provided with an aperture through which light travels from said primary mirror to said secondary mirror and also having a second aperture through which the poser may observe his image in said secondary mirror as reflected from the said primary mirror; a light shutter interposed in the path between the said swinging primary mirror and the said bodily-movable secondary mirror; and means for selectively adjusting said shutter away from the path between said mirrors.

3. In a pose-reflecting apparatus, the combination of a primary mirror mounted for swinging movement in a substantially-horizontal plane; two secondary mirrors spaced from and angularly disposed with respect to the said primary mirror and respectively located at divergent points on the respective opposite sides of the light path between a poser and the said primary mirror; a casing around said primary mirror and having a central aperture through which a poser may observe his reflection and having two lateral apertures, each of which permits light to travel from the said primary mirrors to one of the said secondary mirrors; a pair of retirable shutters, each of which is adapted to close one of the lateral apertures in the said casing enclosing the said primary mirror; and actuating means connecting said shutters with said primary mirror to alternately retire the said shutters as the said primary mirror is swung from side to side.

4. In a pose-reflecting apparatus, the combination with a camera having a shutter; of a movable pose-reflecting mirror having an aperture registrable with the light path between a poser and the shutter of the said camera; latching means serving to releasably hold the said pose-reflecting mirror in position to maintain its aperture out of registration with the light path between the poser and the shutter of the said camera; and fluid pressure operating means connected to move the said latching means into its mirror-releasing position and having connections simultaneously serving to open the shutter of the said camera.

5. In a pose-reflecting apparatus, the combination with a camera; of mirror-guide means swinging in a substantially-horizontal plane and having a back panel provided with an aperture arranged in line between normal position of a poser and the said camera; pivotal supporting means for said guide means permitting such swinging thereof while maintaining said aperture in said line; a flexible tubular connection enclosing the aperture in the back panel of the said guide means and extending therefrom to the said camera; and a pose-reflecting mirror having an aperture and movable in the said guide means to register its said aperture with the aperture in the back panel thereof.

6. In a pose-reflecting apparatus, the combination with a camera; of laterally-swinging mirror-guide means; pivotal supporting means therefor; a pose-reflecting mirror having an aperture therein and vertically-movable in said laterally-swinging guide means to bring its said aperture into registration with the light path between a poser and the said camera; and a fluid check connected to said pose-reflecting mirror including two telescoping members carried by the said laterally-swinging mirror-guide means and arranged coaxially with said pivotal supporting means and serving to control the speed of the downward vertical movement of the said pose-reflecting mirror with respect to the said guide means.

7. In a pose-reflecting apparatus, the combination of a primary mirror and a secondary mirror spaced from and angularly disposed with respect to each other and in which secondary mirror a poser may observe his image as reflected from said primary mirror; a supporting frame for said primary mirror mounted for swinging movement in a substantially horizontal plane, whereby the primary mirror occupies one position in which it serves to reflect a poser's image directly back to him, and movable from this latter position to a position in which it serves to reflect an image of the poser to the secondary mirror; means for adjusting said primary mirror vertically in said frame; and yielding detent means serving releasably to hold said frame in either of its two angularly adjusted positions, regardless of the vertical position of said mirror.

8. In a pose-reflecting apparatus, the combination with a primary mirror and a secondary mirror horizontally spaced from and angularly disposed with respect to each other and in which secondary mirror a poser may observe his image as reflected from the said primary mirror, the secondary mirror being mounted in a casing substantially enclosing it and provided with an aperture through which light rays may travel horizontally from said primary mirror to said secondary mirror, and provided also with a second aperture through which the poser may observe his image in said secondary mirror as reflected from said primary mirror, guideways for said casing, and means for bodily adjusting said casing and secondary mirror on said guideways toward and away from said primary mirror.

9. In a pose-reflecting apparatus, a combination of a primary mirror and a secondary mirror spaced from and angularly disposed with respect to each other, said secondary mirror being adapted to receive from said primary mirror reflected images of the poser; a casing for said primary mirror having an opening for the passage of light rays between said mirrors; an adjustable shutter for said opening; means for adjusting the angularity of said primary mirror with respect to said secondary mirror; and means connected to be operated automatically by the adjustment of said primary mirror to operate said shutter whereby said shutter is displaced to permit the passage of light rays between said mirrors when the primary mirror is angularly adjusted to an appropriate position therefor.

10. In a pose-reflecting system, a primary mirror; a housing therefor having a forward opening for the reception of light rays from the subject to said primary mirror; means for adjusting said primary mirror; a secondary mirror spaced from said primary mirror and adapted to receive reflected rays therefrom, said housing having a second opening to permit the passage of such reflected rays; an adjustable shutter for said second opening interposed in the light path between said mirrors; and means operated by the adjustment of said primary mirror to displace said shutter from said path when said primary mirror is adjusted to direct rays towards said secondary mirror; and means for moving said shutter automatically to close said second opening when said primary mirror is adjusted to normal position.

11. In a pose-reflecting apparatus, the combination with a camera, of an adjustable pose-reflecting mirror arranged in front of said camera; an angularly adjustable support for said mirror; guide means therein permitting vertical adjustment of said mirror in said support, a suitable opening being provided in said mirror to permit the passage of light rays to said camera from the subject in a predetermined vertical position of said mirror; and means to control the speed of downward vertical movement of said mirror comprising telescoping piston and cylinder members, a first one of said members being connected to said support to angularly rotate therewith, and the second member being secured to said mirror to rotate and vertically reciprocate with said mirror; and means for angularly adjusting said support and first member.

LUTHER G. SIMJIAN.